(12) United States Patent
Trottier-Lapointe et al.

(10) Patent No.: US 12,529,824 B2
(45) Date of Patent: Jan. 20, 2026

(54) ANTI-REFLECTIVE COATING FOR SIDE REFLECTION

(71) Applicant: Essilor International, Charenton-le-pont (FR)

(72) Inventors: William Trottier-Lapointe, Charenton-le-pont (FR); Pauline Colas, Charenton-le-pont (FR)

(73) Assignee: Essilor International, Charenton-le-Pont (FR)

( * ) Notice: Subject to any disclaimer, the term of this patent is extended or adjusted under 35 U.S.C. 154(b) by 747 days.

(21) Appl. No.: 17/786,077

(22) PCT Filed: Dec. 19, 2019

(86) PCT No.: PCT/IB2019/001391
§ 371 (c)(1),
(2) Date: Jun. 16, 2022

(87) PCT Pub. No.: WO2021/123856
PCT Pub. Date: Jun. 24, 2021

(65) Prior Publication Data
US 2023/0027705 A1    Jan. 26, 2023

(51) Int. Cl.
G02C 7/02 (2006.01)
C09D 1/00 (2006.01)
C09D 5/00 (2006.01)
G02B 1/11 (2015.01)
G02B 1/115 (2015.01)

(52) U.S. Cl.
CPC ............... *G02B 1/115* (2013.01); *C09D 1/00* (2013.01); *C09D 5/006* (2013.01); *G02C 7/02* (2013.01)

(58) Field of Classification Search
None
See application file for complete search history.

(56) References Cited

U.S. PATENT DOCUMENTS

| 4,689,387 A | 8/1987 | Kajimoto et al. |
| 4,775,733 A | 10/1988 | Kanemura et al. |
| 5,059,673 A | 10/1991 | Kanemura et al. |
| 5,087,758 A | 2/1992 | Kanemura et al. |
| 5,191,055 A | 3/1993 | Kanemura et al. |

(Continued)

FOREIGN PATENT DOCUMENTS

| WO | WO 2007096425 | 8/2007 |
| WO | WO 2019175360 | 9/2019 |
| WO | WO 2019180043 | 9/2019 |

OTHER PUBLICATIONS

Larouche et al., "OpenFilters: open-source software for the design, optimization, and synthesis of optical filters", *Applied Optics*, 47(13), C219-C230, 2008.

(Continued)

*Primary Examiner* — Darryl J Collins
(74) *Attorney, Agent, or Firm* — Norton Rose Fulbright US LLP

(57) ABSTRACT

The invention relates to an optical article comprising an anti-reflective edge coating, and to processes for coating an edge an surface of optical article, such as an optical lens, with an anti-reflective coating. The anti-reflective edge coating of optical article according to the invention is suitable for reducing and/or cancelling the visibility of at least one myopia ring and/or white ring.

22 Claims, 6 Drawing Sheets

(56) References Cited

U.S. PATENT DOCUMENTS

| | | | |
|---|---|---|---|
| 2002/0051294 A1* | 5/2002 | Katayama | C03C 17/3441 |
| | | | 359/586 |
| 2003/0011742 A1 | 1/2003 | Ayoub | |
| 2006/0275627 A1 | 12/2006 | Biteau et al. | |
| 2007/0030569 A1 | 2/2007 | Lu et al. | |
| 2007/0178315 A1 | 8/2007 | Thomas et al. | |
| 2011/0244219 A1* | 10/2011 | Kubota | G02B 1/11 |
| | | | 977/773 |
| 2015/0055222 A1* | 2/2015 | Tamada | G02B 1/115 |
| | | | 359/581 |
| 2017/0090213 A1 | 3/2017 | Jiang | |
| 2018/0011225 A1* | 1/2018 | Bellman | G02B 5/28 |

OTHER PUBLICATIONS

International Search Report in corresponding PCT Application No. PCT/IB2019/001391 mailed Jan. 9, 2020.

* cited by examiner

ANTI-REFLECTIVE COATING FOR SIDE REFLECTION

CROSS-REFERENCE TO RELATED APPLICATIONS

This application is a national phase application under 35 U.S.C. § 371 of International Application No. PCT/IB2019/001391 filed 19 Dec. 2019, the entire contents of which disclosure is specifically incorporated by reference herein without disclaimer.

TECHNICAL FIELD OF THE INVENTION

The invention relates generally to optical articles with an edge coating, and to processes for coating an edge surface of an optical article, such as an optical lens.

BACKGROUND INFORMATION AND PRIOR ART

A coating material may be introduced on the edge of an optical article as an edge coating for various reasons. For example, a coating may be deposited on the edge of an optical lens to prevent or reduce visibility of "myopia rings" and "white rings" for aesthetic purposes. Examples of a "myopia ring" and a "white ring" are shown in FIG. 1A and FIG. 1B as 114 and 112, respectively. Myopia rings can be observed for thick lenses worn by people with myopia, and are more numerous for high myopia people. Myopia rings may be caused total internal reflections of light from one or both of the optical surfaces and/or the edge surface. White rings, on the other hand, may be caused by light being transmitted or reflected by the lens edge, and may be observed visually from the front of the lens. White rings may be more visible for thick ophthalmic lenses. By reducing or eliminating reflections caused the edge surface, visibility of the myopia rings or white rings otherwise appearing along the perimeter of the ophthalmic lens face may be reduced or eliminated.

Prior art has provided solutions to coat the edge of the lens with an opaque coating, so as to absorb light that is transmitted by the edge of the lens and that is doing total internal reflections inside the lens. Such a coating reduces visibility of myopia rings and white rings.

Patent application WO2019/180043 discloses an opaque coating for coating the edge of an ophthalmic lens to be used in an eyewear, wherein the refractive index of the edge coating and of the ophthalmic lenses are accurately selected. The coating disclosed in this application preferably comprises an opacity agent dispersed in a matrix material.

The homogeneity and the opacity of the opaque coatings positioned on the lens edge need to be very good in order to completely eliminate the myopia rings. In addition, the opaque coating needs to be very durable and resistant to alterations such as contact with chemical agents, or mechanical aggressions. Consequently, the chemistry of these opaque coatings needs to be quite complex, also triggering processing difficulties. In addition, for high myopic prescriptions, which lead to thicker lenses, the opaque coating may become very visible on the lens edge, thus being less aesthetic.

In light of the above, there remains a need for alternative and improved edge coatings for optical articles, which are suitable for reducing and/or cancelling the visibility of at least one myopia ring and/or white ring.

SUMMARY OF THE INVENTION

The invention first relates to an optical article comprising a first optical surface and a second optical surface, wherein the first optical surface and the second optical surface are connected by an edge surface, wherein the optical article comprises a base material and an anti-reflective coating disposed on at least part of the edge of the base material, the anti-reflective coating being suitable for reducing and/or cancelling the visibility of at least one myopia ring and/or white ring.

The second object of the invention is a process for coating at least part of an edge surface of an optical article, comprising the steps of:
a) providing an optical article comprising a first optical surface and a second optical surface, wherein the first optical surface and the second optical surface are connected by an edge surface,
b) disposing at least one anti-reflective coating material on at least part of the edge surface of the optical article to obtain an at least partial edge coating,
the anti-reflective coating being suitable for reducing and/or cancelling the visibility of at least one myopia ring and/or white ring.

The invention finally relates to a process for designing an anti-reflective stack comprising at least one absorbent layer and one low index (LI) layer, comprising the successive modeling of layers starting from the closest layer to the base material to the furthest layer from the base material, so as to take into account the reflection coming from the base material.

BRIEF DESCRIPTION OF THE DRAWINGS

The following description with reference to the accompanying drawings will make it clear what the invention consists of and how it can be achieved. The invention is not limited to the embodiment/s illustrated in the drawings. Accordingly, it should be understood that where features mentioned in the claims are followed by reference signs, such signs are included solely for the purpose of enhancing the intelligibility of the claims and are in no way limiting on the scope of the claims.

In the accompanying drawings.

DETAILED DESCRIPTION

Optical Article

Figure 1A:
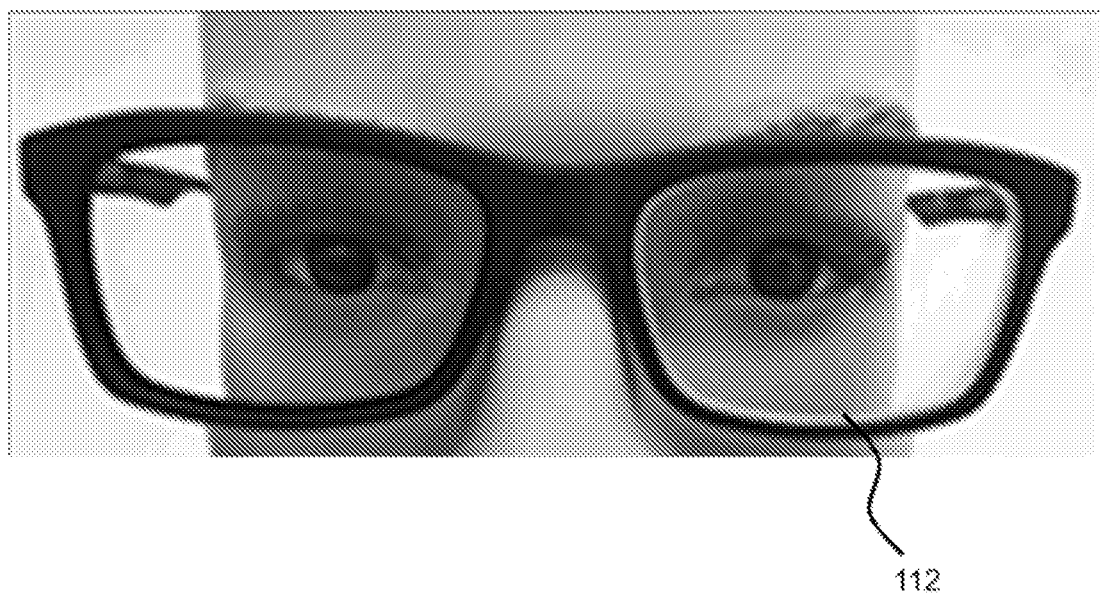
FIG. 1A is a photograph showing front view of a user wearing an eyeglass 100. A white ring 112 is shown.
Figure 1B:
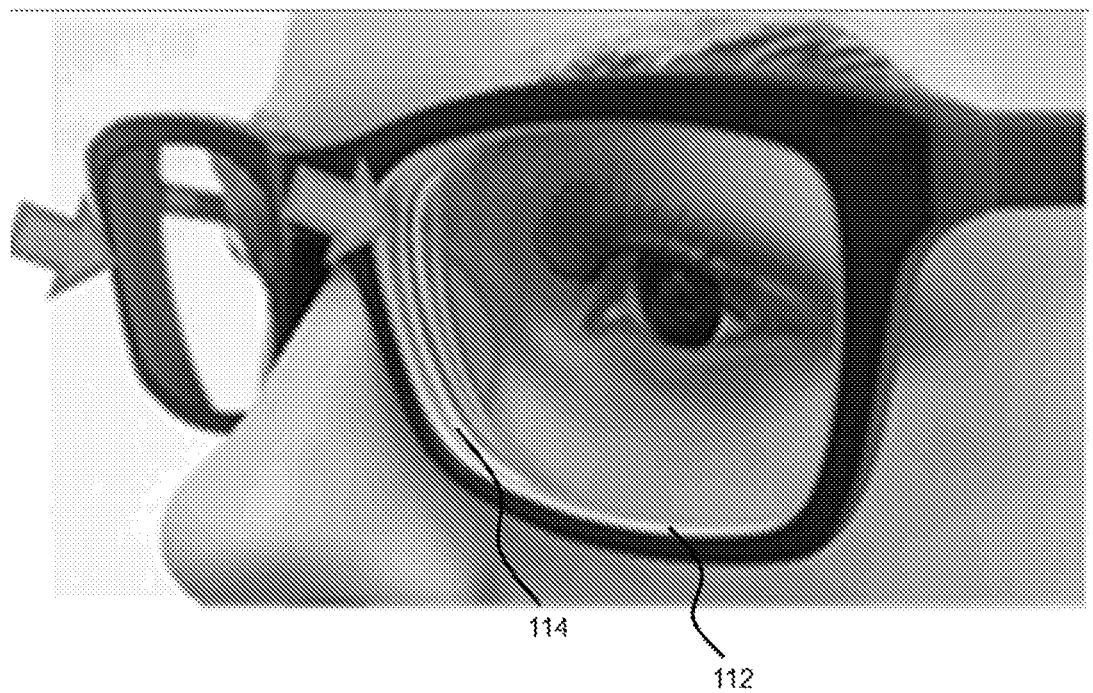
FIG. 1B is a photograph showing side view of a user wearing an eyeglass 100. A white ring 112 and a myopia ring 114 are shown.

The invention first relates to an optical article comprising a first optical surface and a second optical surface, wherein the first optical surface and the second optical surface are connected by an edge surface, wherein the optical article comprises a base material and an anti-reflective coating disposed on at least part of the edge of the base material, the anti-reflective coating being suitable for reducing and/or cancelling the visibility of at least one myopia ring and/or white ring. The visibility of the myopia rings and/or white rings should be reduced or cancelled especially when an individual looks at another individual bearing the optical article.

The optical article comprises a first optical surface and a second optical surface which are connected by an edge surface. Preferably, the optical article is an optical lens. In particular, the optical article is an ophthalmic lens. The ophthalmic lens may be mounted in an eyeglass frame.

As used herein, the term "optical lens" refers to any type of lens intended to be supported by a wearer's face, which may be for purposes of improving or enhancing visual acuity, for protecting against the environment, for fashion, or for adornment. The term may refer to ophthalmic lenses, such as non-corrective lenses, semi-finished lens blanks, and corrective lenses, such as progressive addition lenses, unifocal or multifocal lenses. The term may also include one or more of prescription, non-prescription, reflective, anti-reflective, magnifying, polarizing, filtering, anti-scratch, colored, tinted, clear, anti-fogging, ultraviolet (UV) light protected, or other lenses. Further examples of optical lens include electronic lens, virtual reality (VR) lens, and the like.

An optical lens may be manufactured in accordance with wearer specifications from an optical lens blank such as a semi-finished lens blank. A semi-finished lens blank generally has two opposite surfaces at least one of which is unfinished. The unfinished surface of the lens blank may be machined according to the wearer's prescription to provide the required surface of the optical lens. An optical lens having finished back and front surfaces may be referred to as an uncut optical lens. In the case of an ophthalmic lens for the correction or improvement of eyesight, for example, the ophthalmic lens may be manufactured according to a wearer prescription corresponding to the visual requirements of that wearer. At least one of the surfaces of the ophthalmic lens may be processed to provide an ophthalmic lens according to the wearer prescription. Alternatively, an ophthalmic lens may be directly injected or casted. In such manufacturing processes, the front and back sides are finished and the obtained lens is already according to the prescription of the wearer. They are ophthalmic stock lenses.

The shape and size of the spectacle frame supporting the optical lens may also be taken into account. For example, the contour of the uncut optical lens may be edged according to a shape of a spectacle frame on which the optical lens is to be mounted in order to obtain an edged or cut optical lens.

As used herein, the term "optical surface" refers to surface of a substrate, or base material, in the form of a bare optical lens without any coating disposed on the optical surface(s), such as an unfinished or untreated optical lens, as well as surface of a coating which may be designed to be temporarily or permanently disposed on the optical surface(s) of a bare optical lens. Examples of a coating that may be disposed on an optical lens include an anti-breakage coating, an anti-scratch coating, an anti-reflection coating, a tint coating, a color coating, an anti-static coating, an anti-smudge coating, a topcoat, an anti-reflective coating, an asymmetrical mirror and a hardcoat. In various embodiments, the first optical surface and the second optical surface may independently be a substrate or base material, a substrate having a hard coat, or a substrate having an anti-reflective coating, a hardcoat, and a topcoat disposed thereon. In various embodiments, the first optical surface and the second optical surface may respectively be a concave surface and a convex surface of the optical lens.

The first optical surface and the second optical surface are connected by an edge surface, or more simply, by an edge. As used herein, the terms "edge surface" and "edge" indifferently refer to a lateral flank and/or external contour of an optical lens. For example, the edge surface may define a surface on the lateral flank and/or external contour of an optical lens upon which a coating material is to be disposed. The edge surface may include a lens bevel and a safety bevel. The term "lens bevel" refers generally to the edge of a lens shaped like a "V", and may help to secure the lens after it has been inserted in an eyewear frame. The term "safety bevel", on the other hand, refers to a flattening bevel ground on the external contour of the optical lens, which may be formed at an interface between the external contour and the optical faces of the optical lens, whereby the sharp edges have been removed for a safer lens. The lens bevel and the safety bevel may constitute a profile on the edge surface.

In some embodiments, the optical lens may further include a step-back on a perimeter portion of one or both of the first optical surface and the second optical surface abutting the edge surface. In such embodiments, the profile on the edge surface may include the step-back along with the lens bevel and the safety bevel. A step-back may form a "L" shape with reference to the edge surface and the optical surface of the optical lens or may be of any other shapes such as a "C" shape, a staggered "L" shape, or an irregular shape, for example, with reference to the edge surface and the optical surface of the optical lens. The step-back portion may be used to retain the at least one coating material with object of providing a desired colored contour on the optical lens. For example, the step-back portion with the at least one coating material could provide a desired colored contour which looks like the rim of eyeglasses frame.

In some embodiments, neither the first optical surface nor the second optical surface of the optical article is coated with the anti-reflective coating disposed on at least part of the edge of the base material. The edge of the base material is substantially the only part of the optical article wherein the anti-reflective coating is disposed.

The base material of the optical article can be any material known in the art as base materials of optical articles. The substrate may be made of thermosetting (cross-linked) organic glasses. Among appropriate thermosetting materials can be cited diethylene glycol bis(allylcarbonate) polymers and copolymers (in particular CR-39® from PPG Industries, Essilor Orma® lenses), polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof.

Additional examples of substrates suitable to the present invention are those obtained from thermosetting polythiourethane resins, which are marketed by the Mitsui Toatsu Chemicals company as MR series, in particular MR6®, MR7® and MR8® resins. These substrates as well as the monomers used for their preparation are especially described in the U.S. Pat. Nos. 4,689,387, 4,775,733, 5,059,673, 5,087,758 and 5,191,055. An example of polymerizable composition comprising a poly(thio)urethane resin that can be used in the present invention is disclosed in patent application WO2007096425.

Preferred materials for the substrate are diethylene glycol bis(allylcarbonate) polymers. In a preferred embodiment, the substrate comprises, preferably is made of, diethylene glycol bis(allylcarbonate) polymer, marketed for instance as CR-39® from PPG Industries.

In some embodiments, the base material is an organic glass. The terms «substrate» and «base material» are used indifferently in the present application for referring to the optical article material on which the coatings are deposited.

The anti-reflective coating can be any anti-reflective coating known in the art and suitable for reducing and/or cancelling the visibility of at least one myopia ring and/or white ring when an individual looks at another individual bearing the optical article.

Preferably, the anti-reflective coating is transparent. The anti-reflective coating may be coloured, and its colour may be chosen for aesthetic reasons. For instance, the colour of the anti-reflective coating can be the same colour as that of the eyeglass frame, or different from the colour of the eyeglass frame.

The anti-reflective coating aims at reducing and/or cancelling the visibility of at least one myopia ring and/or white ring especially when an individual looks at another individual bearing the optical article.

The myopia rings and white rings are more prone to appear when the angle of incidence of the ray of light on the edge of the lens (inside the lens) in the 40°-70° range. Thus, preferably, the reflectance of the anti-reflective coating is lower than 20%, preferably lower than 10%, in particular lower than 1%, for an incident angle ranging from 50° to 70°, preferably from 40° to 70°. In embodiments of the invention, the reflectance of the anti-reflective coating is lower than 20%, preferably lower than 10%, in particular lower than 1%, for an incident angle ranging up to 80°, for instance ranging from 50° to 80°, preferably from 40° to 80°. In other embodiments, the reflectance of the anti-reflective coating is lower than 20%, preferably lower than 10%, in particular lower than 1%, for an incident angle ranging from 0° to 70°, preferably from 0° to 80°.

Preferably, the reflectance of the anti-reflective coating is lower than 20%, preferably lower than 10%, in particular lower than 1%, for any incident angle ranging from 50° to 70°, preferably from 40° to 70°. In embodiments of the invention, the reflectance of the anti-reflective coating is lower than 20%, preferably lower than 10%, in particular lower than 1%, for any incident angle ranging up to 80°, for instance ranging from 50° to 80°, preferably from 40° to 80°. In other embodiments, the reflectance of the anti-reflective coating is lower than 20%, preferably lower than 10%, in particular lower than 1%, for any incident angle ranging from 0° to 70°, preferably from 0° to 80°.

The anti-reflective coating may comprise, preferably consist of, a multilayer anti-reflective stack comprising at least one absorbent layer and at least one low index (LI) layer.

The thickness of the anti-reflective stack may vary to a large extent, depending on parameters such as the edge width, the number of layers, the material of each layer, the deposition technique used, and/or the base material of the optical article. Preferably, the thickness of the anti-reflective stack is lower than or equal to 1 micrometer, especially in the case where the base material is organic glass.

The number of layers of the anti-reflective stack may vary to a large extent, depending on parameters such as the edge width, the material of each layer, and the desired reflectance. Preferably, the anti-reflective stack comprises at least 3 layers, preferably at least 4 layers. Preferably, the anti-reflective stack comprises less than 10 layers, preferably less than 8 layers.

The absorbent layer may be any layer known to one skilled in the art and suitable for absorbing at least part of visible light. Preferably, the extinction coefficient of the absorbent layer is higher than or equal to 0.1.

The anti-reflective stack may comprise at least two, preferably at least three, absorbent layers. In such an embodiment, the absorbent layer with the lowest extinction coefficient is preferably the closest to the base material, and the other absorbent layers are preferably positioned so that an absorbent layer with a higher extinction coefficient is positioned further from the base material than an absorbent layer with a lower extinction coefficient.

The absorbent layer may be a high index (HI) layer with a refractive index of at least 1.55, preferably at least 1.60, in particular at least 1.65. HI layers may comprise, without limitation, one or more mineral oxides such as $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nd_2O_5$, $HfO_2$, $Sc_2O_3$, $Pr_2O_3$, $Al_2O_3$, or $Si_3N_4$, as well as suboxidations thereof, such as $TiO_x$ with $1 \leq x < 2$, and mixtures thereof.

The material of the absorbent layer can be any material known in the art and affording the desired absorption properties. For instance, the material of the absorbent layer may be, in addition to the HI materials listed above, selected from the group consisting of NiO, SiO, WO, TiO, and any mixture thereof, in particular the material of the absorbent layer is NiO.

The thickness of each absorbent layer may vary to a large extent, depending for instance on the desired properties for the layer, the layer material, the deposition technique and/or the layer position in the stack. For instance, the thickness of an absorbent layer may be comprised between 20 nm and 310 nm, preferably between 20 nm and 200 nm.

The LI layer may be any low index layer may be any layer known to one skilled in the art. The refractive index of the LI layer is preferably lower than 1.55, preferably lower than 1.50, in particular lower than 1.45.

Among the materials suitable for the LI layer can be cited for instance, without limitation, $SiO_2$, $SiO_x$ with $1 \leq x < 2$, $MgF_2$, $ZrF_4$, $Al_2O_3$, $AlF_3$, chiolite ($Na_3Al_3F_{14}$), cryolite ($Na_3[AlF_6]$), or any mixture thereof, preferably $SiO_2$ or $SiO_2$ doped with $Al_2O_3$ which contributes to raising the critical temperature of the stack. When $SiO_2/Al_2O_3$ mixtures are used, the LI layer preferably contains from 1 to 10%, more preferably from 1 to 8% by weight of $Al_2O_3$ relative to the total weight of $SiO_2+Al_2O_3$ in said layer. A too high amount of alumina is detrimental to adhesion of the AR coating. In a preferred embodiment, the LI layer is a $SiO_2$-based layer. The anti-reflective stack may comprise more than one LI layer, which can be made of the same or of different materials.

The thickness of each LI layer may vary to a large extent, depending for instance on the desired properties for the layer, the layer material, the deposition technique and/or the layer position in the stack. For instance, the thickness of a LI layer may be comprised between 10 nm and 200 nm, preferably between 20 nm and 200 nm.

The anti-reflective coating may be coated directly onto the base material. Alternatively, at least one layer may be present between the base material and the anti-reflective coating, such as a hard coat layer. Examples of layers which may be present between the base material and the anti-reflective coating are listed above as examples of coatings that may be disposed on an optical lens.

The anti-reflective coating may be disposed on the entire edge surface of the optical article. Alternatively, it may be disposed on selected portions of said edge surface, such as on one or more facets of a multifaceted edge-surface, the lens bevel, the safety bevel, and/or the step-back. The anti-reflective coating may also be disposed on selected portions of the edge surface when the shape of the optical article makes difficult and/or useless the deposition of the anti-reflective coating on some other portions of the edge surface of the optical article. When the anti-reflective coating is disposed on selected portions of the edge surface, the reducing and/or cancelling of the visibility of the myopia rings and/or white rings is advantageously not affected by the presence of other portions of the edge surface. The other portions of the edge surface which are not coated with the anti-reflective coating may be coated with a different coating material.

The layer of the anti-reflective stack which is the furthest from the base material and is thus in contact with air, also referred to as the outermost layer, may be a LI layer, such as a $SiO_2$ layer. Anti-reflective stacks according to the invention and comprising a LI layer, such as a $SiO_2$ layer, in contact with air reduce, or even better cancel, the mirror effect than can be observed on the ophthalmic lens edge of individuals with high myopia.

Process for Coating the Edge of an Optical Article

The invention also relates to a process for coating at least part of an edge surface of an optical article, comprising the steps of:
a) providing an optical article comprising a first optical surface and a second optical surface, wherein the first optical surface and the second optical surface are connected by an edge surface,
b) disposing at least one anti-reflective coating material on at least part of the edge surface of the optical article to obtain an at least partial edge coating, the anti-reflective coating being suitable for reducing and/or cancelling the visibility of at least one myopia ring and/or white ring when an individual looks at another individual bearing the optical article.

All the features described above for the optical article apply similarly to the process for coating at least part of an edge surface of an optical article of the invention.

In particular, in the process for coating at least part of an edge surface of an optical article of the invention, the anti-reflective coating may be a transparent coating comprising a multilayer stack comprising at least one absorbent layer and at least one LI layer. The extinction coefficient of the absorbent layer is preferably higher than or equal to 0.1.

The process for coating at least part of an edge surface of an optical article of the invention is pretty simple as it only comprises classical deposition steps of well-known layers such as oxide layers, which can be performed by many different techniques well-known in the art.

Step b) of the process of the invention may be performed by any suitable technique known in the art. For instance, at least part of step b) may be performed by a method selected from the group consisting of vacuum deposition, vapor deposition, sol-gel deposition, spin coating, dip coating, spray coating, flow coating, film laminating, sticker coating, roller coating, brush coating, painting, sputtering, casting, Langmuir-Blodgett deposition, laser printing, inkjet printing, screen printing, pad printing, and any combination thereof.

Process for Designing an Anti-Reflective Stack

The invention finally relates to a process for designing an anti-reflective stack comprising at least one absorbent layer and one LI layer, comprising the successive modeling of layers starting from the closest layer to the base material to the furthest layer from the base material, so as to take into account the reflection coming from the base material.

In traditional modeling processes of optical coatings such as anti-reflective stack coatings, the succession of layers is the opposite. Consequently, in order to obtain a process for designing an anti-reflective stack according to the invention from a traditional modeling process, the incoming medium should be identified as the substrate, and the substrate should be identified as air.

In some embodiments, the process for designing an anti-reflective stack according to the invention comprises the successive modeling of layers based on the well-known matrix method, wherein the matrix method is modified in that air and substrate are reversed as the exiting and incoming media in the last step of the method.

The matrix method is well-known in the art and a description of steps thereof is provided for instance in Larouche et al. Applied Optics 2008, 47, 13, C219-C230.

The process for designing an anti-reflective stack according to the invention shows the total internal reflection appearing in the lens and allows controlling, for instance limiting, said total internal reflection, at high angles, in particular at incident angles ranging from 50° to 70°, preferably ranging from 40° to 70°, for instance ranging from 40° to 80°. Controlling the total internal reflection, preferably limiting the total internal reflection, in the modeled lens may be obtained by controlling, preferably limiting, the reflection factor of the coating at high angles, in particular at incident angles ranging from 50° to 70°, preferably ranging from 40° to 70°, for instance ranging from 40° to 80°.

The following examples are provided only for illustrative purposes and do not aim at limiting the scope of the invention.

EXAMPLES

Different anti-reflective stacks according to the invention were simulated, and their reflectance calculated. The characteristics of each stack are presented in the corresponding table below. All stacks of examples 1 to 9 present a low reflectance at high angles (50-70°) and are thus suitable for reducing and/or cancelling the visibility of at least one myopia ring and/or white ring.

In the following examples, materials named ThNnKm are theoretical materials with a refractive index of n and an extinction coefficient of m. One skilled in the art is able to determine with his current knowledge which material is suitable for reaching these theoretical properties.

The anti-reflective stacks of examples 1 to 7 were designed by the successive modelisation of layers starting from the closest layer to the base material to the furthest layer from the base material, so as to take into account the reflection coming from the base material.

TABLE 1

Anti-reflective stack of example 1.

| Layer | Material | Refractive index | Extinction coefficient | Physical thickness (nm) |
|---|---|---|---|---|
| Medium | Hard Coat | 1.59 | 0.00 | |
| | NiO | 2.01 | 0.13 | 36.43 |
| | SiO$_2$ | 1.47 | 0.00 | 84.28 |
| | NiO | 2.01 | 0.13 | 239.08 |
| | SiO$_2$ | 1.47 | 0.00 | 80.59 |
| | NiO | 2.01 | 0.13 | 309.69 |
| Substrate | Air | 1.00 | 0.00 | |
| Total | | | | 750.07 |

Figure 2:
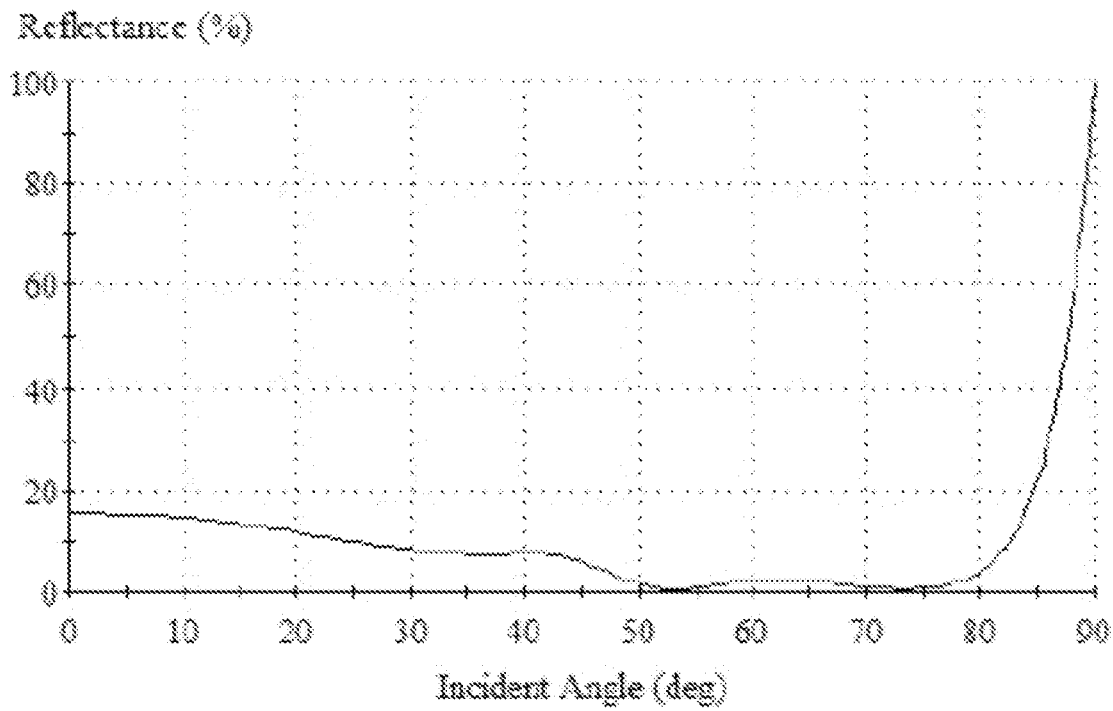
FIG. 2 is the reflection spectrum of the anti-reflective coating of example 1.

The reflectance of the stack of example 1 is presented on FIG. 2.

TABLE 2

Anti-reflective stack of example 2.

| Layer | Material | Refractive index | Extinction coefficient | Physical thickness (nm) |
|---|---|---|---|---|
| Medium | Hard Coat | 1.59 | 0.00 | |
| | ThN2K1 | 2.00 | 1.00 | 20.66 |
| | SiO$_2$ | 1.47 | 0.00 | 187.79 |
| | ThN2K1 | 2.00 | 1.00 | 58.56 |
| Substrate | Air | 1.00 | 0.00 | |
| Total | | | | 267.01 |

Figure 3:
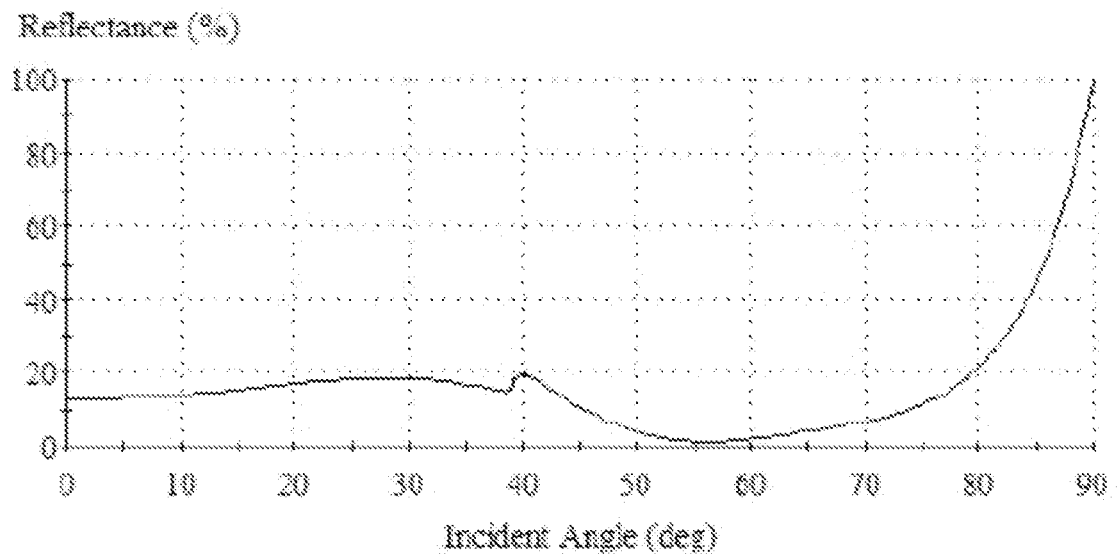
FIG. 3 is the reflection spectrum of the anti-reflective coating of example 2.

The reflectance of the stack of example 2 is presented on FIG. 3.

TABLE 3

Anti-reflective stack of example 3.

| Layer | Material | Refractive index | Extinction coefficient | Physical thickness (nm) |
|---|---|---|---|---|
| Medium | Hard Coat | 1.59 | 0.00 | |
| | ThN2K0.01 | 2.00 | 0.01 | 23.64 |
| | SiO$_2$ | 1.47 | 0.00 | 68.39 |
| | ThN2K0.01 | 2.00 | 0.01 | 57.20 |
| | SiO$_2$ | 1.47 | 0.00 | 13.36 |
| | ThN2K1 | 2.00 | 1.00 | 42.18 |
| Substrate | Air | 1.00 | 0.00 | |
| Total | | | | 204.77 |

Figure 4:
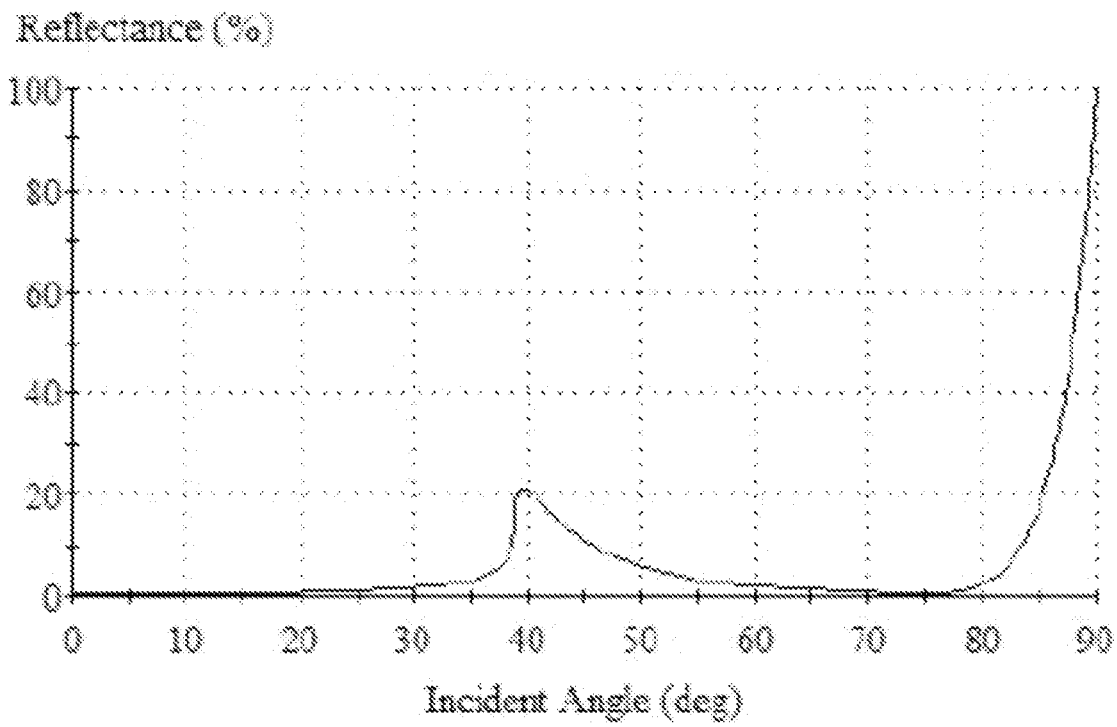
FIG. 4 is the reflection spectrum of the anti-reflective coating of example 3.

The reflectance of the stack of example 3 is presented on FIG. 4.

TABLE 4

Anti-reflective stack of example 4

| Layer | Material | Refractive index | Extinction coefficient | Physical thickness (nm) |
|---|---|---|---|---|
| Medium | Hard Coat | 1.59 | 0.00 | |
| | ThN2K0.01 | 2.00 | 0.01 | 27.41 |
| | SiO$_2$ | 1.47 | 0.00 | 85.09 |
| | ThN2K0.01 | 2.00 | 0.01 | 68.22 |
| | SiO$_2$ | 1.47 | 0.00 | 14.62 |
| | ThN2K1 | 2.00 | 1.00 | 62.06 |
| Substrate | Air | 1.00 | 0.00 | |
| Total | | | | 257.40 |

Figure 5:
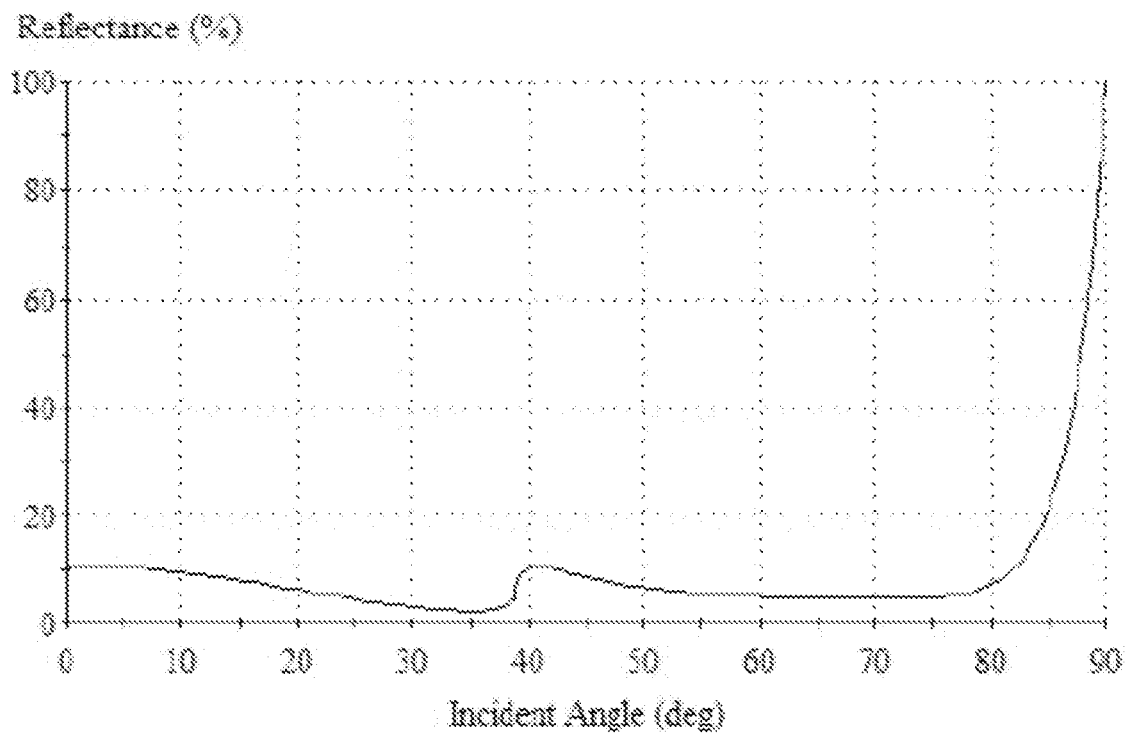
FIG. 5 is the reflection spectrum of the anti-reflective coating of example 4.

The reflectance of the stack of example 4 is presented on FIG. 5.

TABLE 5

Anti-reflective stack of example 5.

| Layer | Material | Refractive index | Extinction coefficient | Physical thickness (nm) |
|---|---|---|---|---|
| Medium | Hard Coat | 1.59 | 0.00 | |
| | ThN2K0.01 | 2.00 | 0.01 | 21.58 |
| | SiO$_2$ | 1.47 | 0.00 | 54.91 |
| | ThN2K0.01 | 2.00 | 0.01 | 35.16 |
| | SiO$_2$ | 1.47 | 0.00 | 22.57 |
| | ThN2K1 | 2.00 | 1.00 | 21.64 |
| | SiO$_2$ | 1.47 | 0.00 | 110.47 |
| | ThN2K1 | 2.00 | 1.00 | 187.81 |
| Substrate | Air | 1.00 | 0.00 | |
| Total | | | | 454.14 |

Figure 6:
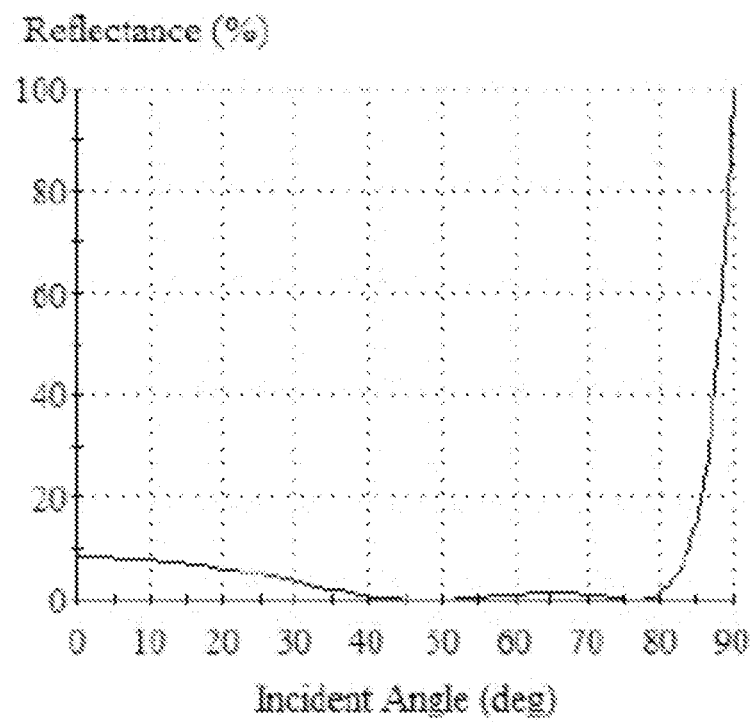
FIG. 6 is the reflection spectrum of the anti-reflective coating of example 5.

The reflectance of the stack of example 5 is presented on FIG. 6.

TABLE 6

Anti-reflective stack of example 6.

| Layer | Material | Refractive index | Extinction coefficient | Physical thickness (nm) |
|---|---|---|---|---|
| Medium | Hard Coat | 1.59 | 0.00 | |
| | ThN2K0.01 | 2.00 | 0.01 | 36.03 |
| | SiO$_2$ | 1.47 | 0.00 | 70.86 |
| | ThN2K0.1 | 2.00 | 0.10 | 94.90 |
| | ThN2K1 | 2.00 | 1.00 | 187.48 |
| Substrate | Air | 1.00 | 0.00 | |
| Total | | | | 389.27 |

Figure 7:
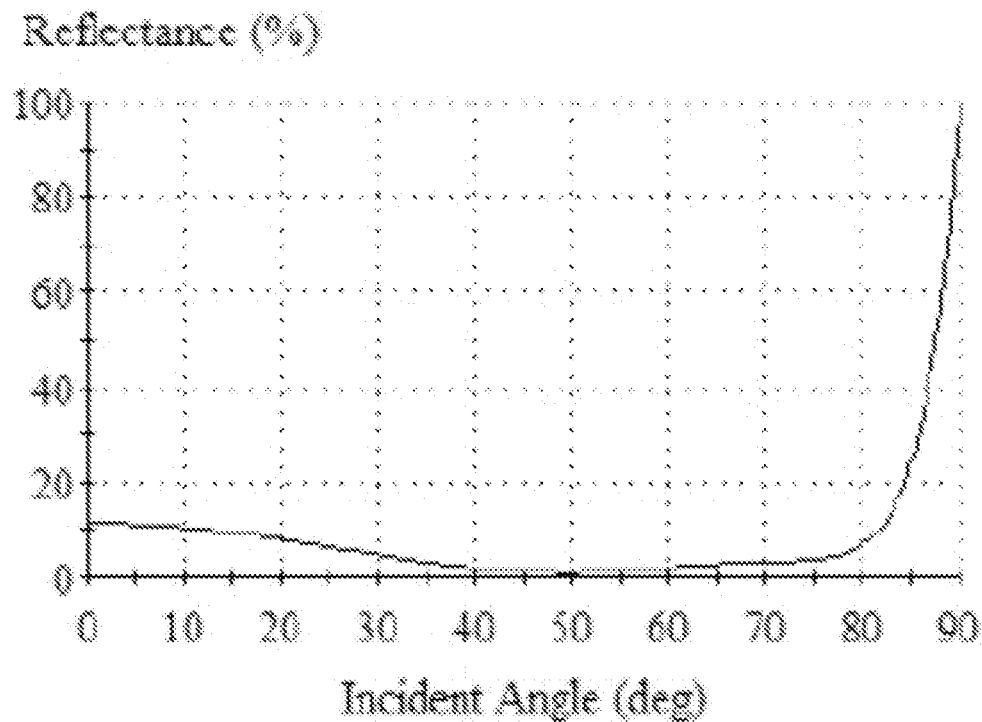
FIG. 7 is the reflection spectrum of the anti-reflective coating of example 6.

The reflectance of the stack of example 6 is presented on FIG. 7.

TABLE 7

Anti-reflective stack of example 7.

| Layer | Material | Refractive index | Extinction coefficient | Physical thickness (nm) |
|---|---|---|---|---|
| Medium | Hard Coat | 1.59 | 0.00 | |
| | ThN2K0.01 | 2.00 | 0.01 | 23.59 |
| | SiO$_2$ | 1.47 | 0.00 | 69.21 |
| | ThN2K0.1 | 2.00 | 0.10 | 35.22 |
| | SiO$_2$ | 1.47 | 0.00 | 63.78 |
| | ThN2K0.3 | 2.00 | 0.30 | 40.09 |
| | SiO$_2$ | 1.47 | 0.00 | 75.21 |
| | ThN2K0.3 | 2.00 | 0.30 | 43.58 |
| | SiO$_2$ | 1.47 | 0.00 | 57.31 |
| | ThN2K0.3 | 2.00 | 0.30 | 81.45 |
| | ThN2K1 | 2.00 | 1.00 | 153.72 |
| Substrate | Air | 1.00 | 0.00 | |
| Total | | | | 643.16 |

Figure 8:
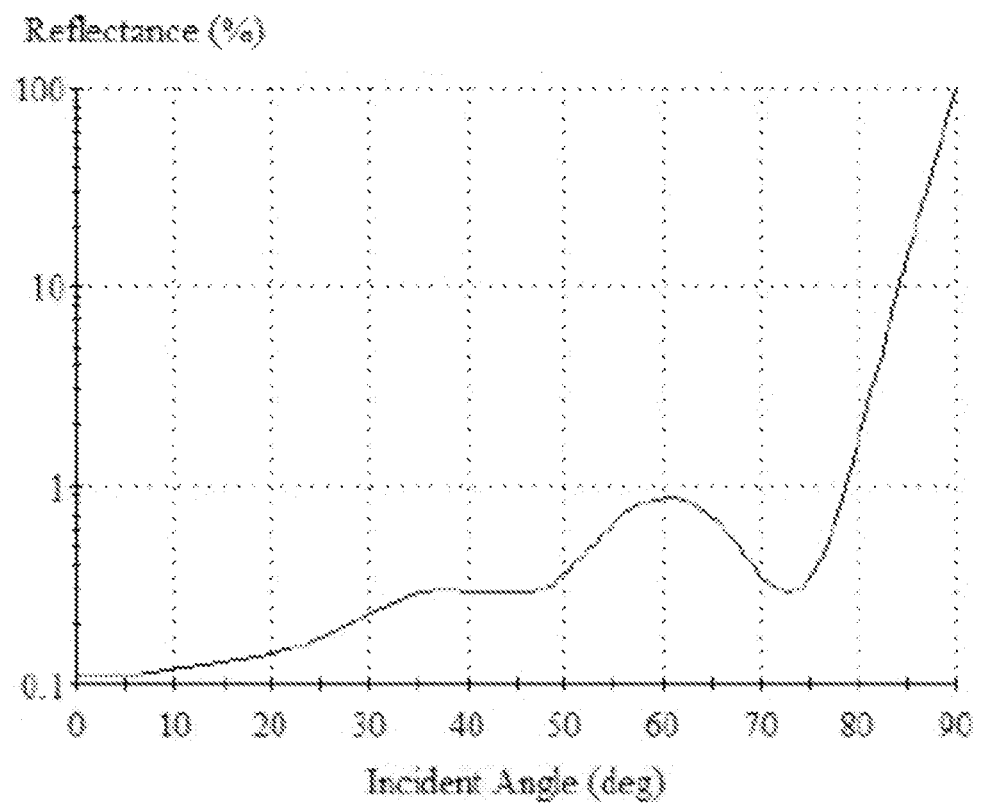
FIG. 8 is the reflection spectrum of the anti-reflective coating of example 7.

The reflectance of the stack of example 7 is presented on FIG. 8.

TABLE 8

Anti-reflective stack of example 8.

| Layer | Material | Refractive index | Extinction coefficient | Physical thickness (nm) |
|---|---|---|---|---|
| Medium | Hard Coat | 1.59 | 0.00 | |
| | ThN2K0.01 | 2.00 | 0.01 | 36.78 |
| | SiO$_2$ | 1.47 | 0.00 | 71.38 |
| | ThN2K0.1 | 2.00 | 0.10 | 77.05 |
| | ThN2K1 | 2.00 | 1.00 | 166.7 |
| | SiO$_2$ | 1.47 | 0.00 | 78.05 |
| Substrate | Air | 1.00 | 0.00 | |
| Total | | | | 429.96 |

Figure 9:
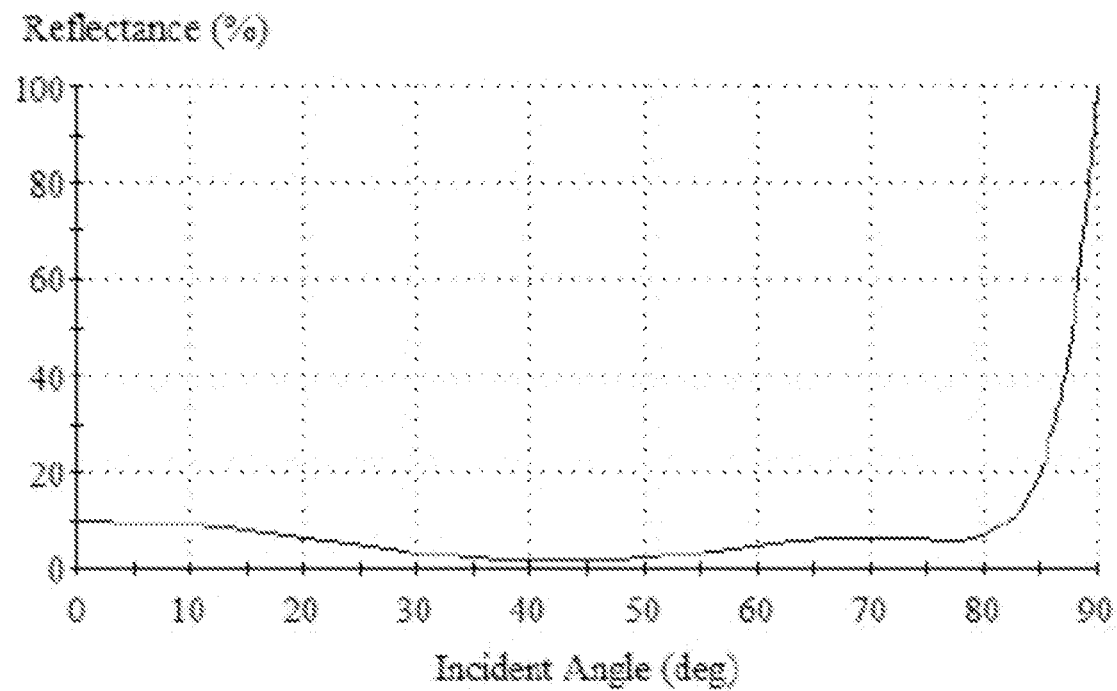
FIG. 9 is the reflection spectrum of the anti-reflective coating of example 8.

The reflectance of the stack of example 8 is presented on FIG. 9.

TABLE 9

Anti-reflective stack of example 9.

| Layer | Material | Refractive index | Extinction coefficient | Physical thickness (nm) |
|---|---|---|---|---|
| Medium | Hard Coat | 1.59 | 0.00 | |
| | ThN2K0.01 | 2.00 | 0.01 | 36.05 |
| | SiO$_2$ | 1.47 | 0.00 | 60.91 |
| | ThN2K0.1 | 2.00 | 0.10 | 72.78 |
| | ThN2K1 | 2.00 | 1.00 | 132.87 |
| | SiO$_2$ | 1.47 | 0.00 | 73.98 |
| Substrate | Air | 1.00 | 0.00 | |
| Total | | | | 376.59 |

Figure 10:
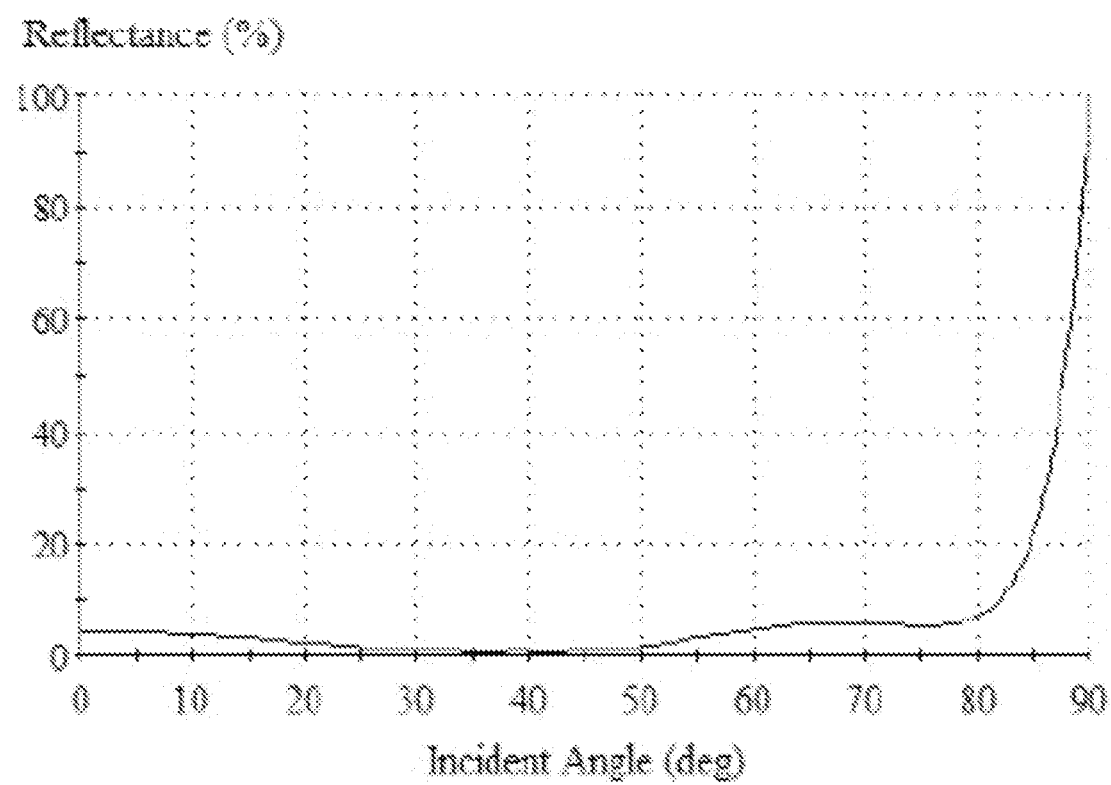
FIG. 10 is the reflection spectrum of the anti-reflective coating of example 9.

The reflectance of the stack of example 8 is presented on FIG. 10.

The invention claimed is:

1. An optical article comprising a first optical surface and a second optical surface,
   wherein the first optical surface and the second optical surface are connected by an edge surface, and
   wherein the optical article comprises a base material and an anti-reflective coating disposed on at least part of the edge of the base material,
   the anti-reflective coating being suitable for reducing and/or cancelling the visibility of at least one myopia ring and/or white ring appearing along a perimeter of an optical article face,
   wherein the anti-reflective coating is a transparent coating comprising a multi-layer anti-reflective stack comprising at least one absorbent layer and at least one low index layer, and
   wherein an extinction coefficient of the at least one absorbent layer is greater than or equal to 0.1,
   wherein the optical article is an ophthalmic lens,
   wherein the reflectance of the anti-reflective coating is less than 10% for an incident angle ranging from 50° to 75°.

2. The optical article of claim 1, wherein the refractive index of the at least one low index layer is lower than 1.55.

3. The optical article of claim 1, wherein at least one low index layer is a SiO$_2$ based layer.

4. The optical article of claim 1, wherein the at least one absorbent layer is a high index layer, with a refractive index of at least 1.55.

5. The optical article of claim 1, wherein a material of the at least one absorbent layer is selected from the group consisting of NiO, SiO, WO and TiO.

6. The optical article of claim 1, wherein the multilayer stack comprises at least two absorbent layers, wherein the absorbent layer with the lowest extinction coefficient is the closest to the base material, and wherein the other absorbent layers are positioned so that an absorbent layer with a higher extinction coefficient is positioned further from the base material than an absorbent layer with a lower extinction coefficient.

7. The optical article of claim 1 wherein the outermost layer is a low index layer.

8. The optical article of claim 1, wherein the thickness of the anti-reflective stack is lower than or equal to 1 micrometer.

9. The optical article of claim 1, wherein the anti-reflective stack comprises at least 3 layers and/or the anti-reflective stack comprises less than 10 layers.

10. The optical article of claim 1, wherein the base material is organic glass.

11. A process for designing an anti-reflective stack of an optical article according to claim 1 comprising at least one absorbent layer and one low index layer, comprising the successive modeling of layers starting from the closest layer to the base material to the furthest layer from the base material, so as to take into account the reflection coming from the base material.

12. A process for coating at least part of an edge surface of an optical article, said optical article being an ophthalmic lens, comprising the steps of:
   a) providing an optical article comprising a first optical surface and a second optical surface, wherein the first optical surface and the second optical surface are connected by an edge surface, and
   b) disposing at least one anti-reflective coating material on at least part of the edge surface of the optical article to obtain an at least partial edge coating,
   the anti-reflective coating being suitable for reducing and/or cancelling the visibility of at least one myopia ring and/or white ring appearing along a perimeter of an optical article face,
   wherein the anti-reflective coating is a transparent coating comprising a multilayer anti-reflective stack comprising at least one absorbent layer and at least one low index layer, and
   wherein an extinction coefficient of the at least one absorbent layer is greater than or equal to 0.1,
   wherein the reflectance of the anti-reflective coating is less than 10% for an incident angle ranging from 50° to 75°.

13. The process for coating at least part of an edge surface of an optical article of claim 12,
   wherein the anti-reflective coating is a transparent coating comprising a multilayer stack comprising at least one absorbent layer and at least one low index layer, and
   wherein the extinction coefficient of the absorbent layer is higher than or equal to 0.1.

14. The process for coating an edge surface of an optical article of claim 12, wherein at least part of step b) is performed by a method selected from the group consisting of vacuum deposition, vapor deposition, sol-gel deposition, spin coating, dip coating, spray coating, flow coating, film laminating, sticker coating, roller coating, brush coating, painting, sputtering, casting, Langmuir-Blodgett deposition, laser printing, inkjet printing, screen printing, pad printing, and any combination thereof.

15. An optical article comprising a first optical surface and a second optical surface, wherein the first optical surface and the second optical surface are connected by an edge surface, wherein the optical article comprises a base material and an anti-reflective coating disposed on at least part of the edge of the base material, the anti-reflective coating being suitable for reducing and/or cancelling the visibility of at least one myopia ring and/or white ring appearing along the perimeter of the optical article face, the anti-reflective coating being a transparent coating comprising a multilayer anti-reflective stack comprising at least one absorbent layer and at least one low index layer, and the extinction coefficient of the at least one absorbent layer being higher than or equal to 0.1, wherein the multilayer stack comprises at least two absorbent layers, wherein the absorbent layer with the lowest extinction coefficient is the closest to the base material, and wherein the other absorbent layers are positioned so that an absorbent layer with a higher extinction coefficient is positioned further from the base material than an absorbent layer with a lower extinction coefficient.

16. The optical article of claim 15, wherein the reflectance of the anti-reflective coating is lower than 20% for an incident angle ranging from 50° to 75°.

17. The optical article of claim 15, wherein the refractive index of the at least one low index layer is lower than 1.55.

18. The optical article of claim 15, wherein at least one low index layer is a $SiO_2$ based layer.

19. The optical article of claim 15, wherein the at least one absorbent layer is a high index layer, with a refractive index of at least 1.55.

20. The optical article of claim 15, wherein a material of the at least one absorbent layer is selected from the group consisting of NiO, SiO, WO and TiO.

21. The optical article of claim 15, wherein the thickness of the anti-reflective stack is lower than or equal to 1 micrometer.

22. The optical article of claim 15, wherein the anti-reflective stack comprises at least 3 layers and/or the anti-reflective stack comprises less than 10 layers.

* * * * *